United States Patent [19]  [11] 3,927,007
Lüssling et al. [45] Dec. 16, 1975

[54] CATALYSTS FOR THE PRODUCTION OF AROMATIC AND HETEROAROMATIC NITRILES

[75] Inventors: Theodor Lüssling; Hans Schaefer, both of Grossauheim; Wolfgang Weigert, Offenbach, all of Germany

[73] Assignee: Deutsche Gold- und Silber-Scheideanstalt vormals Roessler, Germany

[22] Filed: Aug. 23, 1973

[21] Appl. No.: 390,775

Related U.S. Application Data

[62] Division of Ser. No. 167,878, July 30, 1971, abandoned.

[30] Foreign Application Priority Data

Aug. 8, 1970 Germany............................ 2039497

[52] U.S. Cl......... 260/294.9; 260/326 R; 260/465 C
[51] Int. Cl.²............... C07D 213/00; C07C 120/14
[58] Field of Search..................... 260/294.9, 465 C

[56] References Cited

UNITED STATES PATENTS

| 3,475,350 | 10/1969 | Winnick et al................. | 260/465 C |
| 3,497,545 | 2/1970 | Golden et al. .................. | 260/465 C |
| 3,637,797 | 1/1972 | Decker et al. .................. | 260/465 C |

FOREIGN PATENTS OR APPLICATIONS

| 43-27219 | 11/1968 | Japan.............................. | 260/465 C |
| 43-27220 | 11/1968 | Japan.............................. | 260/465 C |
| 43-27221 | 11/1968 | Japan.............................. | 260/465 C |
| 1,403,472 | 4/1964 | France............................ | 260/465 C |

*Primary Examiner*—Joseph P. Brust
*Attorney, Agent, or Firm*—Cushman, Darby & Cushman

[57] ABSTRACT

Catalysts for the reaction of alkyl substituted aromatic and heteroaromatic hydrocarbons with ammonia and oxygen to form the corresponding nitriles are prepared by heating a compound of the elements Sb, V and O with at least one of the elements Fe, Cu, Ti, Co, Mn and Ni at 600° to 1100°C. in oxygen.

13 Claims, No Drawings

CATALYSTS FOR THE PRODUCTION OF AROMATIC AND HETEROAROMATIC NITRILES

This is a division of application Ser. No. 167,878 filed July 30, 1971 and now abandoned.

The invention is directed to catalysts for the reaction of alkyl substituted aromatic (i.e. alkyl carbocyclic aryl) and heteroaromatic hydrocarbons with ammonia and oxygen to form nitriles and to the process of preparing such nitriles.

There are several such known processes for the production of nitriles from the corresponding alkyl substituted compounds which are characterized by various reaction conditions and especially by various catalysts. For the catalysts there are chiefly used elements such as antimony, vanadium, molybdenum, tungsten, chromium and manganese. They are employed particularly as oxides, for the most part in mixtures or, in a given case in compounds with each other, and for the mosts part, on carriers based on silicon dioxide or aluminum oxide.

Of the known processes and catalysts only a few which in general are suited for the conversion of the alkyl substituted aromatic and heteroaromatic compounds to the corresponding nitriles which also are industrially significant, namely those which make possible high space-time-yields and simultaneously show a good selectivity. According to experience the selectivity is reduced with increasing conversion and simultaneously the yield of the desired nitriles is reduced while the proportion of by-products increases correspondingly.

It is also known to use catalysts consisting of compounds of antimony and vanadium on a carrier (German Auslegeschrift 1,286,002 and German Auslegeschrift 1,240,125).

These processes, however, are not generally usable. According to our own experience for example they result in only a small yield of o-phthalodinitrile by the reaction of o-xylene. In another process a similar catalyst is used with the addition of alkali oxide (Netherlands Application 68 101 89). This process it is true makes possible the production of nitriles with favorable yields. However, it requires a high excess of ammonia.

It is further known to employ vanadium oxide-chromium oxide mixture or aluminium oxide as a catalyst (German Auslegeschrift 1,172,253). This process is especially oriented to the production of o-phthalodinitrile. It has the disadvantage that the catalyst is only difficultly produced with reproducible properties and that its preparation requires great precision, especially in regard to the selection of aluminum oxide of a suitable quality.

It is further known to use catalysts produced essentially out of tungsten compounds, in a given case with the addition of various other metals (German Auslegeschrift 1,279,012). This process to be sure has proven selective in the conversion of various hydrocarbons. However, only small space-time-yields are obtained.

There have now been found catalysts for the reaction of alkyl substituted aromatic (alkyl carbocyclic aryl) and heteroaromatic hydrocarbons with ammonia and oxygen to form the corresponding nitriles which consist of the compounds formed by treating with oxygen at temperatures from 600° to 1100°C. compounds from the elements Sb, V and O and one or more of the elements Fe, Cu, Ti, Co, Mn and Ni.

The catalysts of the invention differ advantageously from the catalysts used in known processes by a high selectivity; the amount of by-products in the production of the nitrile is also small. The catalysts of the invention permit the attainment of an extraordinarily favorable space-time-yield. It is very noteworthy that these catalysts not only can be used successfully for the conversion of individual compounds but in generally alkyl substituted aromatic and heteroaromatic hydrocarbons can be converted in good yields to nitriles.

Examples of suitable starting materials are toluene, o-xylene, m-xylene, p-xylene, ethyl benzene, α-methyl napthalene, β-methyl naphthalene, mesitylene, p-cymene, 1,8-diethyl naphthalene, n-butylbenzene, β-picoline, α-picoline, gamma picoline, 2,5-lutidine, α-methyl quinoline, 1,2-diethylbenzene and 1,4-diethyl benzene.

Examples of nitriles which can be formed include benzonitrile, p-toluonitrile, o-toluonitrile, m-toluonitrile, terephthalonitrile, isophthalodinitrile, o-phthalodinitrile, trimesic acid trinitrile, alpha-cyanonaphthalene, nicotinic acid nitrile, (β-cyanopyridine), α-cyanopyridine, gamma cyanopyridine, 2,5-dicyanopyridine, 2,6-dicyanopyridine, 1-methyl-2,4-benzodinitrile, 2-methyl-2,4-benzodinitrile.

In the reaction o-xylene in particular ophthalodinitrile is formed in good yields. Phthalimide on the contrary is formed only in small amounts.

The catalysts are composed of the elements antimony and vanadium with the addition of one or more of the elements iron, copper, titanium, cobalt, manganese and nickel. Of these additives titanium, cobalt, manganese and nickel are preferred. Manganese and nickel are especially preferred. The elements in general are present in the catalysts as oxides or as compounds with each other and oxygen.

In order to produce the catalysts of the invention there are first placed together suitable mixtures of starting materials containing the corresponding elements and these are then treated with oxygen at temperatures in the range of 600° to 1100°C. A large excess of oxygen is employed in such treatments.

Antimony and vandium are preferably added as the oxides, e.g. antimony trioxide or antimony pentoxide, vanadium tetroxide ($V_2O_4$), vanadium trioxide or vanadium pentoxide. Most preferably antimony trioxide and vandium pentoxide are used: There can be used as starting materials, however, the elements themselves or any compounds of antimony and vandium as long as they can be converted to compounds of antimony and vanadium with oxygen. Suitable for example are the ammonium salts of the vanadium acids, e.g. ammonium metavandate, or halogen compounds of vanadium and antimony, e.g., vanadium trichloride, antimony tribromide, antimony trichloride, antimony pentachloride or organic compounds of antimony and vanadium such as, antimonyl tartrate and vanadyl oxalate. Iron, copper, titanium, cobalt, manganese and nickel can likewise be used as the oxides, e.g. ferrous oxide, ferric oxide, cupric oxide, cuprous oxide, titanium dioxide, cobaltous oxide, cobaltic oxide, nickel monoxide, manganese monoxide and manganese dioxide. There can also be used the elements themselves or any compounds of the elements insofar as they can be converted into oxides with oxygen. Thus there can be used cobaltous nitrate, copper nitrate, ferric nitrate manganous nitrate, nickel nitrate as well as salts of any of these elements with other acids such as hydrochloric acid, hydrobromic acid for example, e.g. cupric chloride, titanium tetrachloride and ferric bromide.

The proportions are so chosen that the atomic portion of antimony is greater than that of vanadium. The atomic ratio of antimony to vanadium is between 1.1 to 1 and 50 to 1, preferably between 1.1 to 1 and 25 to 1. There can be used as the atomic ratio of antimony to iron, cobalt, copper, manganese and nickel individually or, if more than one of them are used, collectively from 2 to 1 up to 20 to 1, preferably 3 to 1 up to 10 to 1, especially from 4 to 1 up to 10 to 1. However, the atomic portion of iron, cobalt, copper, manganese and nickel whether employed individually or collectively should not exceed the atomic amount of vanadium. As atomic ratios of antimony to titanium there can be employed from 1 to 3 up to 8 to 1, preferably from 1 to 2 up to 4 to 1, especially 1 to 1 up to 4 to 1, There is first prepared a thorough mixture of the starting materials. For this purpose the materials can be mixed directly as solids. It has proven advantageous, however, to add water, in a given case to introduce one or more of the materials to be mixed as an aqueous solution or as a suspension in water, and then to evaporate these water containing mixtures to dryness in order to recover the catalyst.

The catalysts thus prepared by mixing of the starting materials, in a given case with the addition of water, are heated to temperatures beween 600° and 1100°C. and at these temperatures are treated for some time in the presence of oxygen. The method of heating as well as the temperature and the duration of the treatment are adjusted according to the type of starting material and according to the methods chosen for preparation of the mixtures.

The materials can be heated directly to the treatment temperature. However, it can be advantageous, especially if water is used in the production of the mixture to first heat the materials moderately and to slowly increase the temperature, in a given case in the course of several hours, uniformly or preferably stepwise, to the treatment temperature between 600° and 1100°C. Thus, for example first there can be employed a temperature in the range of 250° to 450°C. and then there can be selected a temperature in the range of 450° to 600°C. The materials are held at these temperatures generally as the case might be for 10 to 60 minutes, frequently for up to 4 hours. It is important that during the entire time of heating that the materials are in contact with oxygen.

Finally the materials are treated with oxygen at a temperature between 600° and 1100°C., preferably between 650° and 1000°C., most preferably between 650° and 800°C. It can be advantageous to treat the materials in succession at different temperatures within this range. In this connection there can be an increase in temperature or a decrease in temperature in the treatment following the first treatment. The treatment is carried out for about 1 to 20 hours, especially about 1 to 10 hours. Air can generally be used as the source of oxygen but there can be used other sources, e.g. pure oxygen.

In the event that the starting compounds are not oxides or other compounds with oxygen the treatment with oxygen forms in the catalyst material said oxides or oxygen containing compound. The conversion into these compounds, however, can take place entirely or partially before or during the preparation of the mixtures.

A preferred procedure is to treat antimony or antimony trioxide with concentrated nitric acid, to separate off the antimony oxide hydrate formed to suspend it in water and to add to the suspension vanadium pentoxide or ammonium vanadate and the other elements as the nitrates; except that titanium is usually added as titanum dioxide. After evaporation of the water containing mixtures the catalyst materials are held for 30 minutes in the presence of air at approximately 450°C. and then for 2 hours at about 500°C. Finally they are treated with air for about 30 minutes at about 650°C. and for 4 to 8 hours at 750°-800°C.

The catalysts can be used as such or on carriers, or admixed with carriers. They are suited for use both in packed beds and fluidized beds and are used correspondingly for example in the form of pellets or in granular form.

For the preparation of pellets it is advantageous to start with materials which have already been heated for some time in the presence of oxygen to temperatures between 250° and 450°C. It can also be advantageous to add tabletting aids to the materials. Illustrative of such aids is graphite. There can generally be added 1 to 10 weight %, especially 2 to 5 weight % of graphite. After formation of the pellets the catalyst materials are treated in the same manner previously described with oxygen at temperatures between 600° and 1100°C. It can likewise be of advantage to first heat moderately and slowly raise the temperature to the treatment temperature of 600° to 1100°C. A preferred procedure is first to hold the catalyst materials as pellets in the presence of air for about 2 hours at 500°C.

The reaction of alkyl substituted aromatic and heteroaromatic hydrocarbon with ammonia and oxygen to form nitriles using the catalysts of the invention takes place in the customary way in the gas phase. A wide latitude is permitted in the selection of reaction conditions. The reaction is chiefly carried out without the use of pressure or with slight superatomspheric pressure up to 3 atmospheres at temperatures between 250° and 600°C., preferably between 300° and 550°C. The proportions of hydrocarbon (or heterocyclic) to ammonia to oxygen can vary within wide limits. There can be used stoichiometric amounts. Preferably however the ammonia is used in 2 to 5 times the stoichiometric amount in relation to the hydrocarbon (or heterocyclic). The oxygen can be used depending on the reaction conditions in amounts up to 100 times the stochiometric amounts in relation to the hydrocarbon (or heterocyclic). If necessary the gas mixture can be prediluted with inert gas such as, for example, nitrogen, carbon dioxide, helium, argon or steam; in particular in place of adding pure oxygen there can be used air. The concentration of hydrocarbon (or heterocyclic) is preferably 0.5 to 10 volume %. The amount of hydrocarbon (or heterocyclic) fed is dependent upon the rest of the reaction conditions. There generally is fed between 0.5 and 10 moles, especially between 0.5 and 5 moles, of hydrocarbon (or heterocyclic) per liter of bulk volume of catalyst per hour.

In the following examples there were used the calculations below in making the determinations.

$$\text{Conversion} = \frac{\text{Moles of reacted hydrocarbon}}{\text{Moles of added hydrocarbon}} \times 100 \, (\%)$$

$$\text{Yield} = \frac{\text{Moles of product formed}}{\text{Moles of added hydrocarbon}} \times 100 \, (\%)$$

$$\text{Feed} = \frac{\text{Moles of added hydrocarbon/Time}}{\text{Bulk volume of the catalyst}} \quad \frac{(\text{Mol})}{(1 \times h)}$$

$$\text{Space-time Yield} = \frac{\text{Amount of nitrile produced/time}}{\text{Bulk volume of the catalyst}} \quad \frac{(g)}{(1 \times h)}$$

Unless otherwise indicated all parts and percentages are by weight.

Example I 700 grams of antimony(III)oxide ($Sb_2O_3$) were added with stirring to 1600 ml. of 65% nitric acid and the mixture was heated at the boiling point until no more nitrous gas developed. The thus pretreated antimony oxide was filtered off with suction, washed with water and finally suspended in 800 ml. of water. In this suspension there were introduced with stirring 109.2 grams of vanadium pentoxide ($V_2O_5$) and 150.6 grams of manganese(II)nitrate tetrahydrate (Mn $(NO_3)_2 \cdot 4H_2O$). The mixture was held at the boiling point for 90 minutes, subsequently dried on a drum drier and then heated for 30 minutes in an airstream at 450°C. The catalyst which was thus prepared contained antimony, vandium and manganese in the atomic ratio 8 to 2 to 1 and, after adding 3 weight % of graphite, was pelleted, heated, in an airstream for 2 hours at 500°C., 30 minutes at 650°C. and 4 hours at 600°C and finally comminuted to a particle size of 0.6 to 1.0 mm.

10 ml. of this catalyst was filled into a fixed bed reactor of alloy steel and having an inner diameter of 11mm. and a length of 200mm. The reactor was heated by a salt melt to 440°C. and a gas mixture of 1 volume % o-xylene, 10 vol. % of ammonia, 30 vol. % of air and 59 vol. % nitrogen introduced. The feed of o-xylene was 1.94 mol/1×h., the conversion of o-xylene was 100%. The spacetime-yield to o-phthalodinitrile was 169 g/1×h. The yield was 68% o-phthalodinitrile, 20% o-tolunitrile and 7.4% phthalimide.

EXAMPLE 2

A catalyst prepared according to example 1 was used in a solid bed reactor to react at a salt bath temperature of 445°C. a gaseous mixture of 6 vol. % toluene, 30 vol. % ammonia and 64 vol. % of air. The toluene feed was 3.81 moles / 1 × h, the conversion of toluene was 85% the spacetime-yield to benzonitrile was 294 grams / 1 × h and the yield of benzonitrile 75%.

EXAMPLE 3

There was used a catalyst prepared according to example 1 in a solid bed reactor at a salt bath temperature of 430°C to react a gaseous mixture of 6 vol. % beta picoline, 30 vol. % ammonia and 64 vol. % air. The feed of beta picoline amounted to 3.81 mol/1 × h, the conversion of beta picoline 95% the space-time-yield to nicotinonitrile 305 g/1×h and the yield of nicotinonitrile 77%.

EXAMPLE 4

A mixture of 350 grams of antimony (III) oxide ($Sb_2O_3$) and 800 ml. of 65% nitric acid were held at the boiling point for 1 hour. The thus pretreated antimony oxide was filtered off with suction, washed with water and finally suspended in 400 ml. of water. There were introduced into this suspension with stirring 54.6 grams of vanadium pentoxide ($V_2O_5$) and 121 grams of iron (III) nitrate nonahydrate ($Fe(NO_3)_3 \cdot 9H_2O$). The mixture was held at the boiling point for 90 minutes, subsequently dried on a drum drier and then heated for 30 minutes in an airstream at 450°C. The thus prepared catalyst in which the antimony, vanadium and iron were present in the atomic ratio of 8 to 2 to 1 after the addition of 3 weight % graphite was pelleted, heated in an airstream for 4 hours at 800°C. and finally cooled to 400°C. within 4 hours.

It was further employed as in example 1. However, there was used a gas mixture of 1 vol. % o-xylene, 10 vol. % ammonia and 89 vol. % air. The temperature of the salt bath was 450°C. The feed of o-xylene ws 0.648 mol/1×h, the conversion of o-xylene was 100%, the space-time-yield to o-phthalodinitrile was 59 grams/1×h. The yields were 71% of o-phthalodinitrile, 12% o-tolunitrile and 11% phthalimide.

EXAMPLE 5

A mixture of 350 grams of antimony (III) oxide ($Sb_2O_3$) and 800 ml. of 65% nitric acid were held at the boiling point for 1 hour with stirring. The thus pretreated antimony oxide was filtered off with suction, washed with water and finally suspended in 400 ml. of water. There were introduced into this suspension with stirring 54.6 grams of vanadium pentoxide ($V_2O_5$) and 87.4 grams of cobalt (II) nitrate hexahydrate ($Co(NO_3)_2 \cdot 6H_2O$). The mixture was held at the boiling point for 90 minutes, subsequently dried on a drum drier and then heated in an airstream at 450°C. for 30 minutes. The thus prepared catalyst in which the antimony, vanadium and cobalt were present in the atomic ratio of 8 to 2 to 1 were, after addition of 3 weight % graphite, tabletted, heated in an air stream for 2 hours at 500°C., 30 minutes at 650° C. and 4 hours at 800°C. and finally cooled to 400°C. within 4 hours.

It was further employed as in example 4. The temperature of the salt bath was 460°C. The conversion of the o-xylene was 100%, the space-time-yield to o-phthalodinitrile was 59 g/1×h. The yields were 71% of o-phthalodinitrile, 9.5% of o-tolunitrile and 6.3% phthalimide.

EXAMPLE 6

A mixture of 350 grams of antimony (III) oxide ($Sb_2O_3$) and 800 ml. of 65% nitric acid were held at the boiling point for an hour with stirring. The thus pretreated antimony oxide was filtered off with suction, washed with water and finally suspended in 400 ml. of water. There were introduced into this suspension with stirring 54.6 grams of vanadium pentoxide ($V_2O_5$) and 87.2 grams of nickel (II) nitrate hexahydrate ($Ni(NO_3)_2 \cdot 6H_2O$). The mixture was held at the boiling point for 90 minutes, subsequently dried on a drum drier and then heated for 30 minutes in an airstream at 450°C. The thus prepared catalyst in which the antimony, vanadium and nickel were present in the atomic ratio of 8 to 2 to 1 was tabletted after the addition of 3 weight % graphite, heated in an airstream for 2 hours at 500°C., 30 minutes at 650°C. and 4 hours at 770°C. and finally cooled to 400°C. within 4 hours.

It was further processed as in example 1. However, there was used a gaseous mixture of 1 vol. % o-xylene, 10 vol % ammonia and 89 vol % air. The temperature of the salt melt was 428°C. The feed of o-xylene was 1.94 mole/1×h, the conversion of o-xylene 100%, the space-time-yield to o-phthalodinitrile 76 g/1×h. The yield was 71% o-phthalodinitrile, 12% o-tolunitrile and 12% phthalimide.

EXAMPLE 7

There was used a catalyst prepared according to example 6 and there were reacted on the catalyst at a salt bath temperature of 440°C. a gaseous mixture of 2 vol. % toluene, 10 vol. % ammonia and 88 vol. % air. The feed of toluene was 3.81 moles/1×h, the conversion of toluene was 98%, the space-time-yield to benzonitrile was 342 g/1× h and the yield of benzonitrile 87%.

EXAMPLE 8

There was used a catalyst prepared as in example 6 and there were reacted on the catalyst at a salt bath temperature of 430°C. a gaseous mixture of 2 vol % beta picoline, 10 vol. % ammonia and 88 vol. % of air. The feed of beta picoline was 3.81 moles/1×h, the conversion of beta picoline 93%, the space-time-yield to nicotinonitrile 282 g/1×h and the yield of nicotinonitrile 71%.

EXAMPLE 9

There were introduced 243.5 grams of powdered antimony into 1000 ml. of 65% nitric acid which was held at a temperature of 75°C. The mixture was heated at the boiling point until no more nitrous gas developed. The precipitate of antimony oxide hydrate formed was separated off, washed with water and suspended in 200 ml. of water. There were introduced 45.5 grams of vanadium pentoxide ($V_2O_5$) and 60.4 grams of copper (II) nitrate trihydrate (Cu $(NO_3)_2$·3-$H_2O$), The mixture was evaporated to dryness and heated for 30 minutes in an airstream at 450°C. The thus prepared mixture in which the antimony, vanadium and copper were present in the atomic ratio of 8 to 2 to 1 was tabletted, heated for 16 hours in an airstream at 800°C. and cooled to 400°C. inside 4 hours.

The further procedure was as in example 4. The conversion of o-xylene amounted to 100%, the space-time-yield to o-phthalodinitrile was 42g/1×h. The yields were 51% o-phthalodinitrile, 8% o-tolunitrile and 10% phthalimide.

EXAMPLE 10

A mixture of 437.5 grams of antimony(III)oxide ($Sb_2O_3$) and 800 ml. of 65% nitric acid were held at the boiling point for 1 hour with stirring. The thus pretreated antimony oxide was filtered off with suction, washed with water and finally suspended in 600 ml. of water. There were introduced to this suspension with stirring 87.7 grams of ammonium vanadate ($NH_4VO_3$) and 59.9 grams of titanium dioxide ($TiO_2$). The mixture was held for an hour at the boiling point, subsequently dried on a drum drier and heated for 30 minutes in an airstream at 450°C. The thus prepared mixture in which the antimony, vanadium and titanium were present in the atomic ratio of 4 to 1 to 1 after the addition of 3 weight % of graphite was tabletted, heated in an airstream for 2 hours at 500°C., for 30 minutes at 650°C. and for 4 hours at 770° C. and subsequentlly cooled within 4 hours to 400°C. The further procedure was as in example 4. At a salt bath temperature of 470°C. the conversion of o-xylene was 98%, the space-time-yield to o-phthalodinitrile was 56 grams/1×h. The yields were 67% o-phthalodinitrile, 6.8% o-tolunitrile and 2.1% phthalimide.

EXAMPLE 11

A catalyst was produced as described in example 10. However, there were added 239.5 grams of titanium dioxide ($TiO_2$). The atomic ratio of antimony to vanadium to titanium was 4 to 1 to 4.

The rest of the procedure was as in example 6. At a salt bath temperature of 426°C. the conversion of o-xylene was 100%, the space-time-yield to o-phthalodinitrile 152g/1×h. The yields of 61% o-phthalodinitrile, 10% o-tolunitrile and 10% phthalimide.

EXAMPLE 12

There was used a catalyst prepared according to example 11 and there was brought to reaction on this at a salt bath temperature of 465°C. a gaseous mixture of 1.4 vol. % toluene, 7 vol % ammonia and 91.6 vol. % air. The feed of toluene amounted to 2.54 moles/1×h, the conversion of toluene 90%, the space-time-yield to benzonitrile 206 grams/1×h and the yield of benzonitrile 79%.

EXAMPLE 13

There was used a catalyst prepared as in example 11 and there were brought to reaction on this at a salt bath temperature of 460°C. a gaseous mixture of 1.4 vol. % beta picoline, 7 vol. % ammonia and 91.6 vol % air. The feed of beta picoline amounted to 2.54 moles/1×h, the conversion of beta picoline 97%, the space-time-yield to nicotinonitrile 180 grams/1×h and the yield of nicotinonitrile 68%.

What is claimed is:

1. In a process of preparing o-phthalodinitrile or nicotinonitrile from o-xylene or beta-picoline and ammonia and a large excess of oxygen in the gas phase the improvement comprising carrying out the reaction employing as the catalyst a catalyst consisting essentially of the product prepared by heating at 650° to 1000°C in the presence of oxygen a mixture made of (A) the elements (1) Sb, (2) V and (3) an element of the group consisting of Fe, Cu, Ti, Co, Mn or Ni or (B) compounds of such elements (1), (2) and (3) which are oxides or (C) compounds of such elements (1), (2) and (3) which are convertible to oxides by oxygen, wherein the atomic ratio of antimony to vanadium is from 1.1:1 to 50:1 and the atomic ratio of antimony to the total of Fe, Cu, Co, Mn and Ni is from 2:1 to 20:1 and the atomic amount of said other element does not exceed that of vanadium and the atomic ratio of antimony to titanium is from 1:3 to 8:1, said nitrile being formed by replacing an alkyl group of said o-xylene or beta-picoline by a nitrile group.

2. A process according to claim 1 wherein said other element is manganese.

3. A process according to claim 1 wherein said other element is nickel.

4. A process according to claim 1 wherein said other element is titanium.

5. A process according to claim 1 wherein the elements in the catalyst in addition to oxygen are antimony, vanadium and a third element of the group consisting of Fe, Cu, Co, Mn and Ni and the atomic ratio of antimony to vanadium is from 1.1:1 to 25:1 and the atomic ratio of antimony to the third element is from 4:1 to 10:1.

6. A process according to claim 5 wherein the atomic ratio of antimony to vanadium to the third element is 8:2:1.

7. A process according to claim 1 wherein the elements in the catalyst in addition to oxygen are antimony, vanadium and titanium and the atomic ratio of antimony to vanadium is from 1.1:1 to 25:1 and the atomic ratio of antimony to titanium is from 1:1 to 4:1.

8. A process according to claim 7 wherein the atomic ratio of antimony to vanadium is 4:1.

9. A process according to claim 1 wherein the starting compound is o-xylene and the product is ophthalodinitrile.

10. A process according to claim 1 wherein the catalyst is prepared by heating at 650° to 800°C.

11. A process according to claim 1 wherein the starting compound is beta picoline and the product is nicotinonitrile.

12. A process according to claim 1 wherein the catalyst is the product obtained by heating at 650° to 1000°C. in the presence of oxygen compounds of the elements (1) Sb, (2) V and (3) at least one other element of the group consisting of Fe, Cu, Ti, Co, Mn and Ni which are either (A) oxides or (B) compounds convertible to oxides by oxygen.

13. A process according to claim 1 wherein said other element is titanium, the starting compound is beta-picoline and the product is nicotinonitrile.

* * * * *